Jan. 8, 1924.  1,479,789

G. W. COLLIN

AUTOMATIC VALVE CUT-OFF

Filed May 31, 1922  2 Sheets-Sheet 1

INVENTOR.
George W. Collin
BY
Chamberlain & Newman ATTORNEYS.

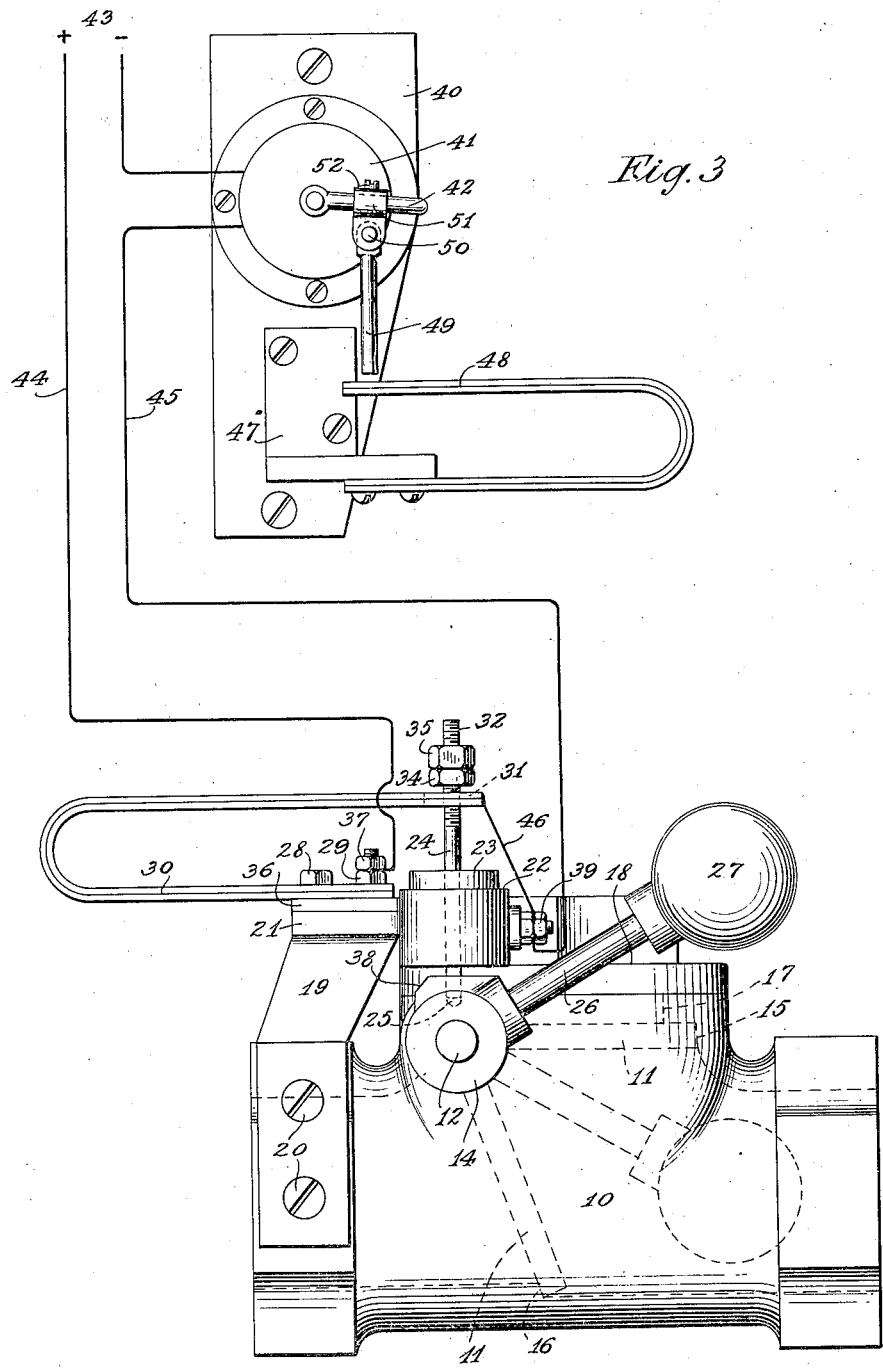

Patented Jan. 8, 1924.

1,479,789

UNITED STATES PATENT OFFICE.

GEORGE W. COLLIN, OF BRIDGEPORT, CONNECTICUT.

AUTOMATIC VALVE CUT-OFF.

Application filed May 31, 1922. Serial No. 564,692.

*To all whom it may concern:*

Be it known that GEORGE W. COLLIN, a citizen of the United States, and resident of Bridgeport, in the county of Fairfield and State of Connecticut, has invented certain new and useful Improvements in Automatic Valve Cut-Offs, of which the following is a specification.

The present invention relates to an automatic valve cut-off device, particularly for use with a gas-supply pipe line to or within a building, although it will be understood that it is not limited to such use but may be used to advantage in a water, oil, gasoline, or other fluid supply pipe.

The principal object is to provide a valve which will automatically cut off the gas or other supply pipe when a predetermined temperature is generated within the building, such, for instance, as may be caused by a fire, the invention being, therefore, in the nature of a safety device.

Another object is to provide for the control of the cut-off valve at one or more remote points, that is, with a single building, there may be one control in each room, and a fire starting in proximity to any one of such controls will cause the valve to automatically operate to cut off the gas supply.
Another object is to provide an electric control, in which the circuit is automatically closed to operate the valve, and automatically opened upon operation of the valve.

Further objects are to provide a thermostatic control, which is of extreme simplicity, will not readily get out of order, and may be regulated with facility to operate at any desired temperature.

A still further object is to provide such a device with which I may use a conventional form of clapper valve, and which may be readily substituted for valves already in use.

With the above and other objects in view, embodiments of the invention will be hereinafter more fully described with reference to the accompanying drawings and finally pointed out in the claims.

In the drawings—

Fig. 3 is a quasi-diagrammatic view showing a modification in which the check-valve is provided with an attached control, and a remote control electrically connected thereto.

Similar reference characters indicate corresponding parts in the several views.

Figure 1:
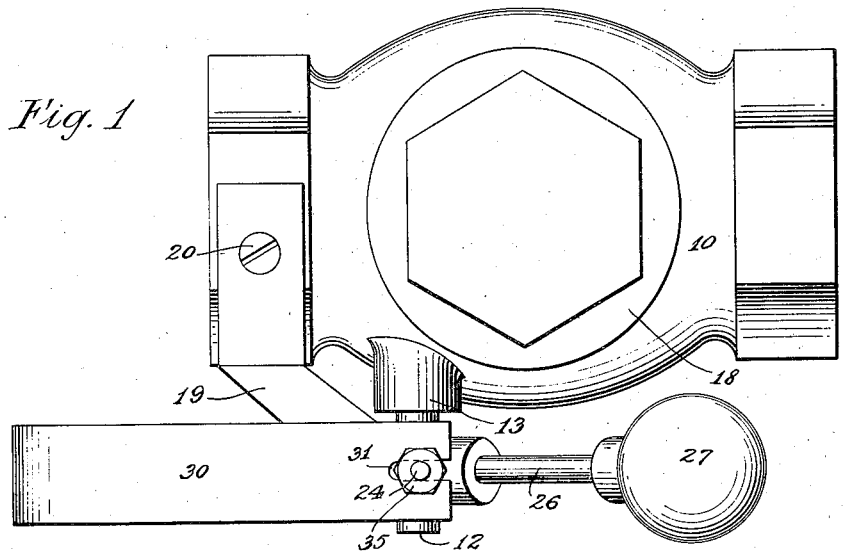
Figure 1 shows a top plan view of a check-valve, having one form of the invention embodied therein.
Figure 2:
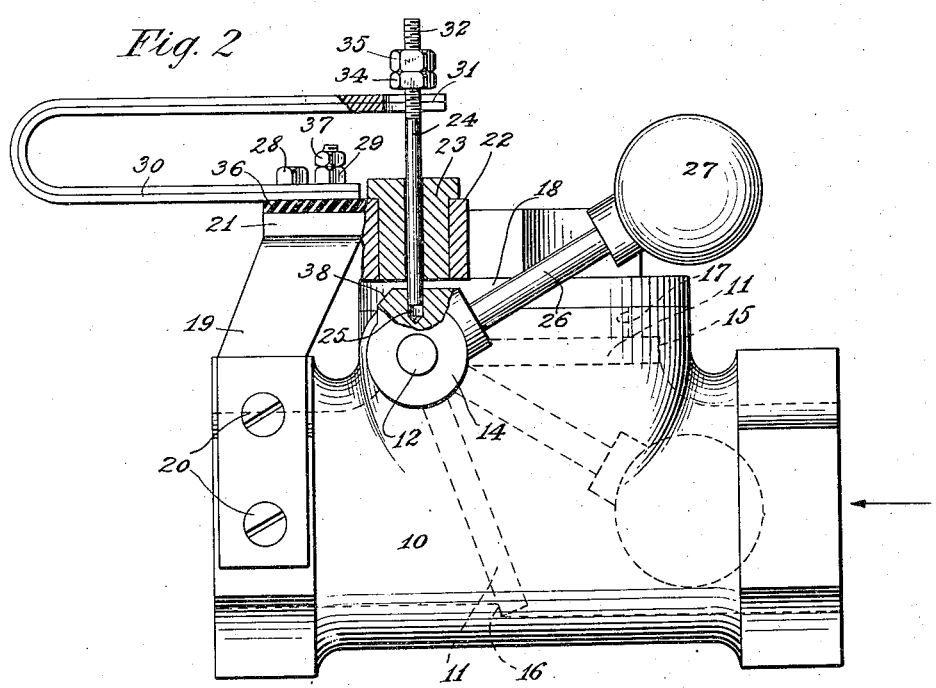
Fig. 2 is another view thereof, partially in side elevation and partially in vertical section; and

Referring more particularly to Figs. 1 and 2 of the drawings, the embodiment shown therein consists of a check-valve 10, adapted to be secured in a gas or other fluid-supply pipe, and provided with a clapper 11, rigidly connected at one end to a shaft 12. The shaft is journaled in a boss 13 of the casing, and is provided at its outwardly projecting end with a rigidly connected hub 14.

The clapper normally seats in an upper recess 15, providing a free-way through the valve. In the closed position the clapper swings downwardly into engagement with a shoulder 16 to close the valve passage. Access may be had to the interior of the valve through an opening 17, normally closed by a plug-cover 18.

A bracket 19 is secured by screws 20 to one end of the valve casing, and is provided with a flat supporting portion 21, having a tubular support, or hub 22 formed thereon, and disposed directly above the hub 14 of the clapper. A tubular flanged bushing 23, preferably formed of graphite, is fitted within the hub 22, and in which there is guided a lock-pin 24, engaging a pocket 25 in the hub 14, to retain the clapper in raised or inoperative position.

The clapper is adapted to be lowered to close the valve by force of gravity, when released, by raising the lock-pin; and to this end, a lever 26, having a weighted end 27, is secured to the hub 14. The dotted lines, Fig. 2, show the lowered or closed position of the clapper.

Upon the flat portion 21 of the bracket 19, there is secured, by screws 28 and 29, one end of a U-plate thermostat 30, having its other end slotted, as at 31, and embracing the upper threaded end 32 of the lock-pin 24. Adjustable lock-nuts 34 and 35 are threaded upon the lock-pin above the thermostat.

An insulating block 36 is interposed between the thermostat and the bracket to electrically insulate it, and the screw 29 also insulated from the valve casing is provided with a terminal-retaining nut 37 for the purpose of connecting the thermostat in a remote control system, if desired—this feature being a modification of the invention which will be presently more fully described.

The operation is as follows:

Normally, the clapper-valve is retained in an open position, to provide a free-way through the valve, by means of the lock-pin 24; and the nuts 34 and 35 are adjusted in spaced relation to the end of the thermostat, determined by the temperature at which it is desired the device will function. Upon the generation of heat in the vicinity of the thermostat such as might be caused by a fire the thermostat expands; and when the temperature reaches the predetermined operative point, the lock-pin is raised, through lifting engagement of the thermostat therewith and releases the clapper. The clapper then drops by gravity under the weight of the lever 26 to its lower position thereby cutting off the supply of gas or other fluid through the valve.

In order to reopen the valve, it is only necessary to lift the lever 26 and the clapper, and insert the lock-pin in the socket 25, this operation being rendered semi-automatic by providing a cam surface 38 upon the hub 14, which lifts the pin as the clapper is raised, thereby permitting it to drop into place in the pocket.

In the form of the invention illustrated in Fig. 3, the valve is adapted both to be controlled by a predetermined temperature rise in its immediate vicinity, and also at one or more distant points. For convenience, only one such distant control device is illustrated. The valve and its immediate control device are substantially similar to the form shown in Figs. 1 and 2, with the exception of an electric terminal connection 39 mounted upon the hub 22.

The distant or remote control device consists of a wall-plate 40, having an electric turn-switch 41 mounted thereon and adapted to be closed or opened by means of a pivoted lever 42. A source of high tension current, as indicated at 43, is connected by a wire 44 to the terminal post 29 of the valve, and a wire 45, having the switch 41 connected in its circuit, is connected to the terminal 39 of the valve body. The terminal 39 is electrically insulated from the thermostat by the blocks 36—36, but is connected to its free end by a thin wire 46 adapted to be automatically severed to break the circuit, as will be presently more fully pointed out. The wire 46 is preferably connected to the movable end of the thermostat by soldering.

Upon the switch-plate 40, there is secured a bracket 47, which supports a U-shaped thermostat 48, having its free end disposed beneath a depending pin 49, freely pivoted at 50 to a clamp 51 secured to the switch lever 42 by a set-screw 52. The lever 42 being normally inclined, the clamp may be longitudinally adjusted thereon to vary the space between the end of the depending pin 49 and the end of the thermostat, thereby predetermining the temperature rise at which the thermostat will engage and lift the pin.

The operation is as follows:

Upon the generation of a predetermined temperature in the vicinity of any of the remote control devices, the thermostat 48 expands, engaging and lifting the pin 49, and turning the lever 42 to close the switch. The high tension current flowing through the circuit heats the resistance wire which in turn transmits heat to the metal thermostat 30, which expands and lifts the lock pin 24 to release the clapper 11. As the thermostat expands, it pulls upon the small resistance wire 46, and upon reaching a predetermined degree of expansion, calculated as sufficient to release the lock-pin, severs it, thereby automatically breaking the high tension circuit.

Should a fire occur in the vicinity of the valve, the thermostat 30 will operate independently of the remote control devices, and at the same time, will break the electric circuit through severing the wire 46, so that spreading of the fire to the vicinity of the remote control devices will not cause the high tension circuit to be completed through operation of the thermostatically-operated switches.

The device according to my invention is of extreme simplicity, will not deteriorate in use, and is entirely efficient in operation.

While I have shown a U-shaped thermostat and a certain type of valve, it will be understood that the invention is not so limited. The devices illustrated and described are preferred and satisfactory embodiments of the invention, but it is obvious that changes may be made therein within the spirit and scope thereof, as defined in the appended claims.

I claim:

1. In combination, a valve, a lock-pin adapted to retain it in one of its functional positions, a U-shaped plate-thermostat having a slotted end embracing said lock-pin, adjustable contact means on said lock-pin above said thermostat, said thermostat adapted to expand at a predetermined temperature to engage and operate said pin to release the valve to move to another functional position.

2. In combination, a valve, means for normally retaining it in one of its functional positions, heat-sensitive means adapted to release said valve from said means to move to another functional position, and means adapted to move said retaining means upon return of the valve to its first functional position to cause said means to move to its normal operative position.

3. In combination, a valve, heat-sensitive means adapted to cause its operation at a predetermined temperature, an electric circuit for heating said means, a switch therefor, and remote heat-sensitive means adapted to close said switch at a predetermined temperature in proximity to said remote heat-sensitive means.

4. In combination, a valve, an electric circuit and switch for controlling operation of the valve, an inclined lever for operating said switch, a thermostat disposed in spaced relation to said lever, and contact means interposed between said lever and thermostat and adjustable upon the lever to determine the operative relation between the contact means and thermostat, said thermostat adapted to cause the operation of said valve at a predetermined temperature.

5. In combination, a valve, heat-sensitive means adapted to cause its operation, a high tension electric circuit connected to said heat-sensitive means, a switch in said circuit at a remote point from said valve, and heat-sensitive means adapted to operate said switch at a predetermined temperature, to cause the operation of said first heat-sensitive means and the operation of the valve.

6. In combination, a valve, a thermostat having a movable part and adapted to cause the operation of the valve at a predetermined temperature, a high tension circuit connected to said thermostat and including a severable connection with said movable part, whereby a predetermined movement of said part will sever the connection and break the circuit, a switch in said circuit, and heat-sensitive means adapted to operate said switch at a predetermined temperature.

7. In combination, a valve, a high tension electric circuit and a switch for controlling the operation of the valve, heat sensitive means to operate the switch, a thermostat adapted to operate the valve, a resistance wire one part of which is connected to the high tension circuit and another part to the thermostat for heating and expanding the latter, said resistance wire being so connected as to insure its breaking with the expansion of the thermostat.

Signed at Bridgeport in the county of Fairfield and State of Connecticut this 29th day of May, A. D. 1922.

GEORGE W. COLLIN.

Witness:
C. M. NEWMAN.